Figure 1:
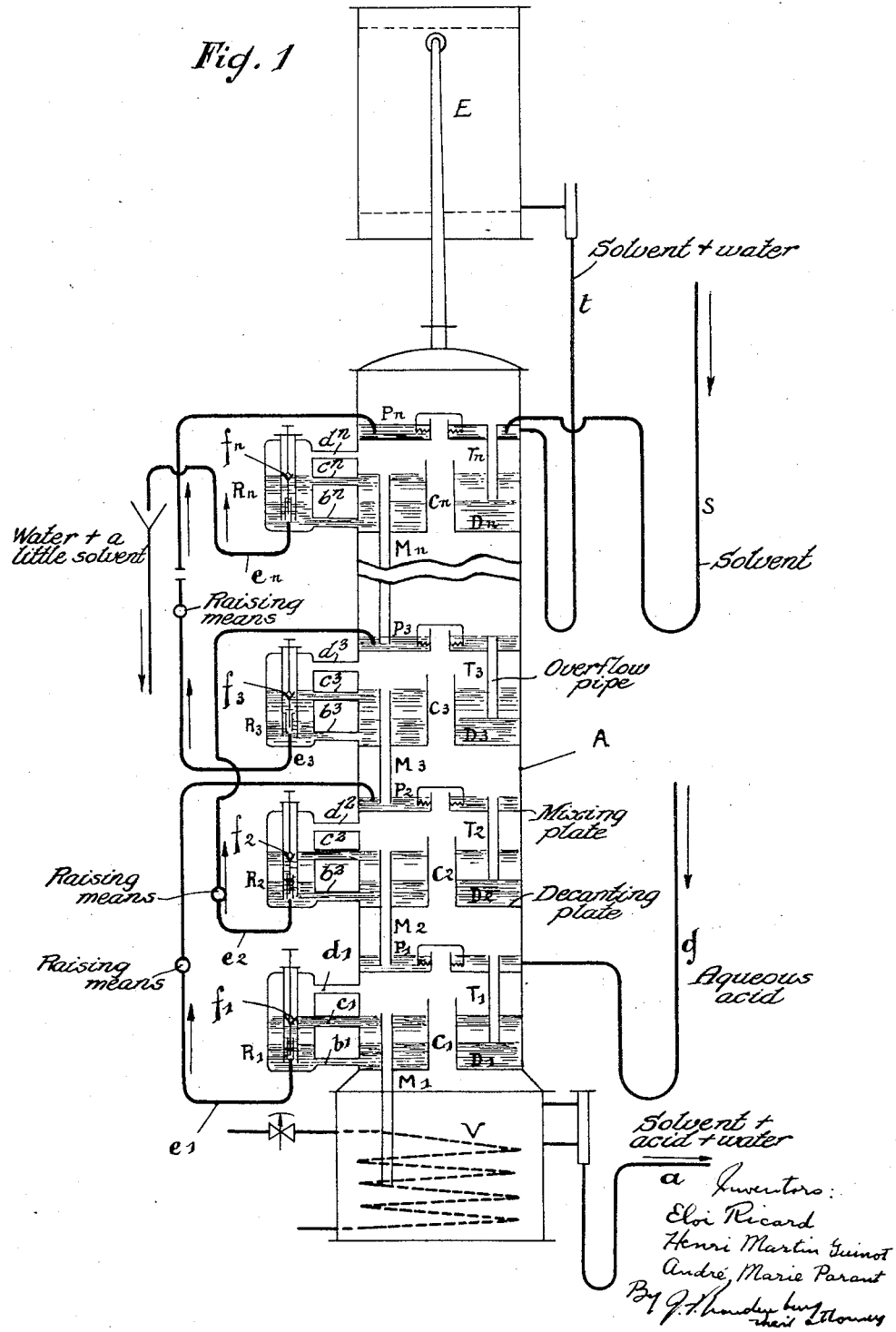

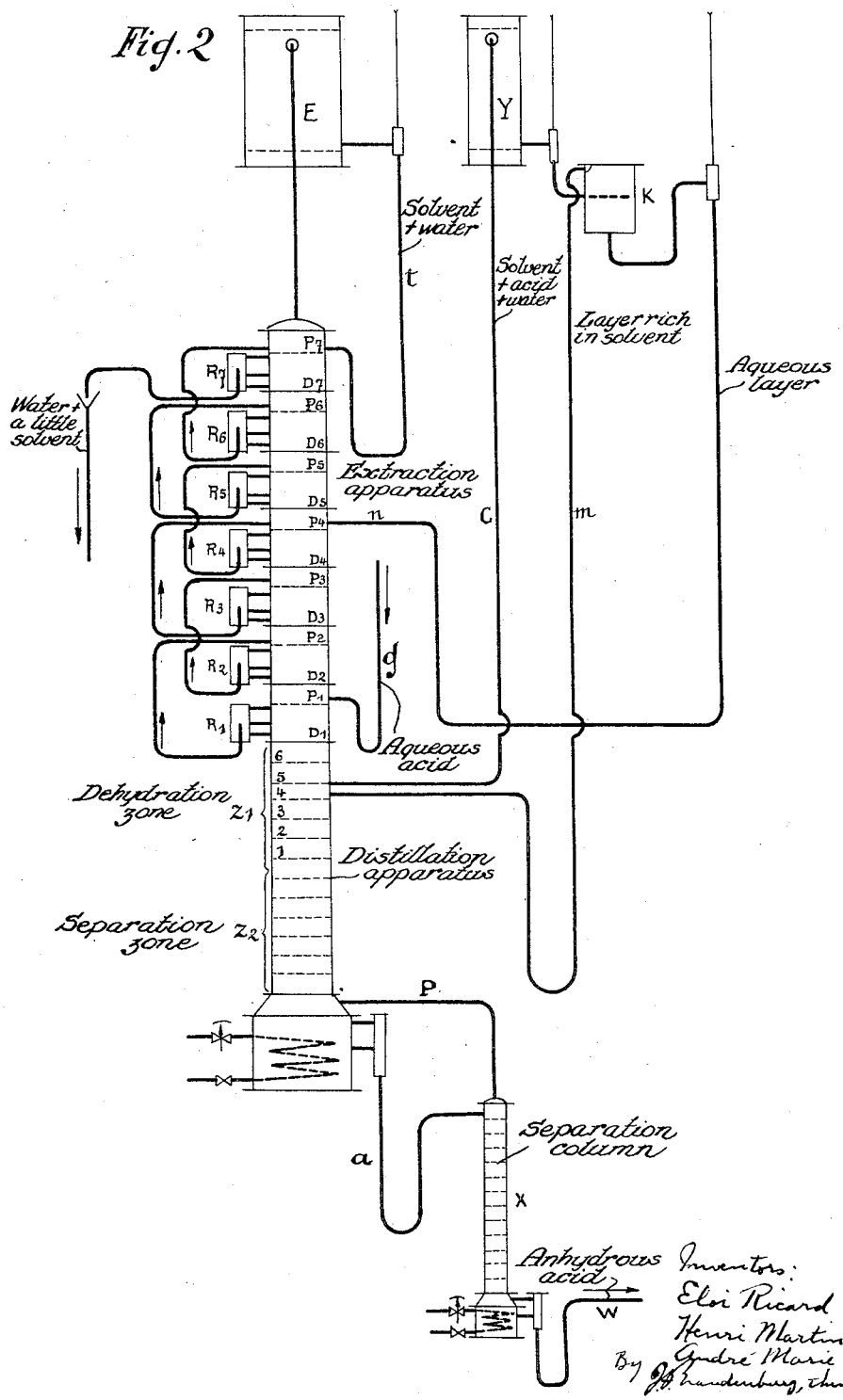

Patented Oct. 1, 1935  2,015,870

UNITED STATES PATENT OFFICE 2,015,870

PROCESS AND APPARATUS FOR CONCENTRATING AND ESTERIFYING ALIPHATIC ACIDS

Eloi Ricard, Henri Martin Guinot, and André Marie Parant, Melle, France, assignors, by mesne assignments, to Société Anonyme: Usines De Melle, Melle, France, a company of France Application September 2, 1931, Serial No. 560,770
In France September 8, 1930

6 Claims. (Cl. 260—106)

This invention relates to a process and apparatus for the continuous separation of a body from its solution in a liquid.

Concentration of acetic acid from aqueous solutions thereof has been the object of various studies.

Among the methods proposed therefor, it seems that at the present time the preferred industrial method consists in extracting, as a first step, acetic acid contained in the aqueous solutions by means of a solvent insoluble or sparingly soluble in water. There is thus obtained a mixture of three bodies: solvent, acid and a relatively slight amount of water.

As a second step, the mixture is separated into its components, either through ordinary distillation, or according to various processes, for example those disclosed in Patents Nos. 1,860,553, 1,839,894 and 1,860,512 and 1,896,100.

The present invention has for a primary object to improve the extraction step.

The extraction step has already been accomplished by using the principles of methodic counter-flow extraction. For instance, this is the principle of the so-called washing towers, with or without internal packing, but, unless huge heights be given to said tower, a thorough extraction can not be arrived at.

The counter-flow system has been improved by employing a series of consecutive elements grouped into a battery. In each of said elements, the acid and the solvent are intimately mixed, then allowed to settle. The acid and the solvent passing from element to element according to counter-flow system, the aqueous solution is thoroughly exhausted.

We have found that the circulation of liquids must necessarily be produced through mechanical means.

The present invention has for an object to bring about an important simplification in the latter methods, and consists in carrying out the stirring in the mixing devices, not through mechanical means, but by bubbling the vapors. This simplification affords important advantages, particularly if combinations of parts such as are hereinafter set forth are employed.

With this invention, extraction may be effected at boiling temperature which is, in most cases, favorable. Decantation may also be effected with the bodies still hot. In the mixing part of each element, intimate contact between the two phases is insured by vapor rising from the next preceding element. We preferably employ apparatus according to the well-known columns having plates.

In one embodiment of the present invention the liquids are mixed on plates of a type well known in the distillation art having one or more bell-covered tubes and overflow pipes. Associated with each mixing plate is a decanting stage in which liquids from the mixing stage settle into layers. Each decanting stage comprises a plate deep compared with the mixing plate and having one or more uncovered tubes and overflow pipes arranged to allow the top layer only to pass into the next stage. The decanting plates may be arranged in the form of one column whilst the mixing plates may be arranged to form a second column, each mixing plate being connected by its overflow pipe to its corresponding decanting plate or alternatively and preferably, each decanting plate may be arranged below its corresponding mixing plate in one column. Thus in the latter case a column comprises alternate mixing and decanting plates.

In this embodiment the solvent flows downwards by gravity whilst the solution is conveyed in the opposite direction, being lifted from element to element through raising of one of the layers in the decanting plate by means of compressed air, inert gas or the like. In the bottom part of the column, there should be provided a sufficient heating to cause a vapor evolution capable of providing a suitable stirring on each column plate. The vapors issuing from the top of the column are composed exclusively of solvent and diluent provided the solvent used does not form a mixture of minimum boiling point with the body. These vapors are condensed and returned to the column. The diluent originally contained in the dilute solution is drawn off from the last decanting plate. It is to be noted that the said diluent (water) has been actually lifted up mechanically from element to element. In fact, it is found that any impurities, present as a solution or as a suspension and contained eventually in the original acid, are recovered entirely in the exhausted solution. A small quantity of the diluent is also raised by azeotropic entrainment with the solvent which has acted over and above as an entrainer of the diluent.

Another object of our invention is to combine the first operation, as above described, with the distillation process that, as already said, allows of separating from one another, according to any known method, the body, the solvent and the slight quantity of diluent.

If the solvent has a boiling point higher than that of the body, the extract leaving the apparatus may be treated in any known convenient manner and the condensers utilized in the latter treatment may also serve to supply the heat necessary for vaporization in the extraction apparatus.

However, our invention is more advantageous when the solvent is one that has a boiling point lower than the boiling point of the acetic acid or body to be separated from solution.

If, on the other hand, the boiling point of the solvent is lower than that of the body, then in the second operation i. e. the distillation operation, the solvent passes over the top with the diluent, leaving the diluent free body as residue. Hence in this case it is possible to superpose the extraction apparatus on the distillation apparatus without necessitating the use of a condenser evaporator between the two main stages. With an arrangement of this character it is possible to charge the whole assembly once and for all with a very small quantity of solvent and to extract practically indefinite quantities of the body without continually feeding fresh solvent to the top of the column.

By suitably controlling the heat supply, and thereby the volume of the reflux fed back to the column, it is possible to a certain extent to increase the supply of the solvent with respect to the supply of dilute solution. In this manner it is possible to effect a more complete separation and it is possible to render the extractive power of the solvent consistent with the number of elements in use.

In this form the process may be utilized for the esterification of aliphatic acids in dilute forms. The extraction of the acid is effected by that alcohol which serves as the esterifier in accordance with French Patents No. 696,496 filed May 17, 1930, in the name of Commercial Solvents Corporation and No. 711,175 filed May 16, 1930, of the applicants. The methods described in the aforementioned patents may be utilized in the apparatus of the present invention. To realize the method and the various embodiments of the present application one of several solvents which are known to be extraction media of aliphatic acids may be used. It will be appreciated, of course, that the present invention resides in a method and not in the employment of a solvent.

If solvents having a high boiling point are used which form with difficulty a mixture of minimum boiling point with water, an entrainer of water may be placed in the extraction apparatus. In this case, it will be the vapors of the water entrainer mixture which will cause the necessary agitation in the mixers.

The drawings illustrate diagrammatically in Figs. 1 and 2 two embodiments of the apparatus to be used for carrying out the process. The drawings will be explained with reference to the following examples.

Example 1

The extraction of a 25% solution of acetic acid with methyl-cyclohexanone, b. p. 164–165° C. The apparatus (Fig. 1) comprises a column A having a number of double elements, each of which comprising a decantation plate ($D_1$, $D_2$, ... $D_n$) surmounted by an ordinary plate, ($P_1$, $P_2$ ... $P_n$) provided with one or more caps and forming the mixing plate. Each mixing plate, with its vapor neck and cap and its overflow pipe, forms a mixing compartment with the interior of the column. Each decanting plate, with its high vapor pipe $C_1$, $C_2$, $C_3$ or $C_n$, and its overflow pipe, forms with the interior of the column a decanting compartment of larger liquid capacity than the mixing compartment. Overflow pipes ($T_1$, $T_2$ ... $T_n$) allowing the liquid to pass from P to D and overflow pipes $M_1$, $M_2$ ... $M_n$, allowing the upper layer in the decantation plate to pass to the plate P immediately below are provided. Vapors rising from each plate pass up the pipe $C_1$, $C_2$, $C_3$ ... $C_n$. Finally each decanting chamber is exteriorly connected to a reservoir ($R_1$, $R_2$ ... $R_n$) by three conduits $b_1$, $c_1$, $d_1$, $b_2$, $c_2$, $d_2$, $b_n$, $c_n$, $d_n$, for example, serving respectively to equalize the levels of the lower layer and of the upper layer and to equalize the pressures in the decanting chamber and the corresponding reservoir. The lower layer may be withdrawn from the reservoir $R_1$, $R_2$. ... $R_n$ through the conduit $e_1$, $e_2$,—$e_n$, having an adjustable inlet $f_1$, $f_2$ ... $f_n$. This layer is raised by any well known means (not shown) for example by the injection of steam to the plate P of the element immediately above it.

The normal operation of the apparatus is as follows:

Methyl-cyclohexanone (200 volumes) is fed through pipe $s$ to the top plate $Pn$. Dilute acetic acid solution (100 volumes) is introduced through pipe $g$ to the lower plate $P_1$, where it meets the methyl-cyclohexanone already charged with acid running by gravity from $M_2$ out of the decanting chamber $D_2$. Heat is supplied to the column by means of the coil V located in the base thereof. The vapors rise in the column through the pipe $C_1$ and pass into the plate $P_1$ where they cause an intense agitation of the two liquids. The acid solvent water mixture pours through the overflow pipe $T_1$ into the decantation plate $D_1$ where it separates into two layers. The upper layer has the following composition:

| | Per cent |
|---|---|
| Methyl-cyclohexanone | 86 |
| Acetic acid | 11.2 |
| Water | 2.8 |

This mixture overflows down pipe $M_1$ into the base of the column where it is withdrawn continuously through pipe $a$. It is then treated for the purpose of separating out the acid and for the recovery of the solvent by any known method. The solvent is fed back into the apparatus.

The lower layer formed of water freed from a part of its acid and containing a little solvent in solution passes into the reservoir $R_1$, and is then raised by means of the raising arrangement through pipe $e_1$ to the second mixing element $P_2$. There it enters in contact with solvent coming from $D_3$ and with the vapors emitted by the liquid in $P_1$, these latter being composed of solvent and water almost free of acid. The liquid in the plate $P_2$ overflows into the decanting chamber $D_2$ where it separates into two layers, the upper layer of solvent runs into $P_1$ whilst the lower aqueous layer is raised to $P_3$ and so forth. It will thus be appreciated that the solvent runs from element to element and meets stronger and stronger acid and is gradually charged with acid and inversely the aqueous solution is raised from element to element, being continuously weakened until it is completely exhausted with the result that only a relatively small number of double plates are necessary.

The lower layer formed in the last decantation plate $D_n$ and drawn off through pipe $e_n$ comprises water free from acid and contains in solution a little methyl-cyclohexanone which is recovered if desired by distillation in an auxiliary small column (not shown). The temperature at the top of the column is in the neighborhood of 96 to 97° C. The vapors emitted by the liquid in the last plate $P_n$ are composed exclusively of solvent and 61.7% water and have practically the exact composition of the binary mixture.

|  | Per cent |
|---|---|
| Methyl-cyclohexanone | 38.3 |
| Water | 61.7 |

These vapors are condensed in E and fed back through the pipe $t$ to the same plate $P_n$.

Numerous other examples can be given utilizing solvents having high boiling points: esters having a boiling point over 118° C., fatty and aromatic acetones, phenols and acyl compounds and so forth.

Example 2

Let a 10% aqueous acetic acid solution be dehydrated. We will use as a solvent isopropyl acetate boiling at 89° C. The apparatus (Fig. 2) comprises a conventional still, having at its bottom part a heating coil or like heating device; on said still is disposed an extraction apparatus of the type described with reference to Fig. 1. Since we are just dealing with a volatile solvent, it is of no use to provide at the top of the extraction column a solvent feed pipe. The extraction is effected by the solvent flowing down continuously through $t$ into the top part of the column, that is by the reflux from the condenser E.

With 10 to 12 elements of the type described in connection with Fig. 1, each comprising a decanting plate D and a mixing plate P, one may readily obtain a substantially complete exhaustion of the original aqueous solution, by so regulating the heat supply as to provide 200 liters of reflux for every 100 liters of aqueous solution supplied. The temperatures are approximately 76° C. at the top of the column and 93° to 94° C. at the base. Under these conditions the water withdrawn from the upper part contains about 3% of the acetate. The condensate fed back from the top of the column is practically free from acid and contains 10% of water, a composition which corresponds to a binary azeotropic mixture.

The extract flows directly from the lowermost decanting plate $D_1$ down to the upper plate 6 of the dehydration zone $Z_1$ of the distillation column. This extract has the following composition:

|  | Per cent |
|---|---|
| Isopropyl acetate | 91.8 |
| Acid | 4.4 |
| Water | 3.8 |

The isopropyl acetate being a good entrainer of water (10%) suffices to eliminate all water contained in the extract, so that six plates are sufficient in the zone $Z_1$ for a thorough dehydration. Then the anhydrous mixture of solvent and acid runs into the separation zone $Z_2$, wherein it is decomposed into its components, owing to the difference of 30° C. between their respective boiling points. The isopropyl acetate vapors rise in the still and re-enter the extraction cycle. As to anhydrous acetic acid, it is withdrawn from the bottom of the still, completely free from acetate.

As the lower plates of the separation zone have to work but slightly, it may be advantageous, from the economy point of view, to replace them by a small auxiliary column $x$ having a slight diameter, in which the anhydrous acetic acid is rid of the last traces of isopropyl acetate. Pure anhydrous acid is withdrawn at $w$ while the isopropyl acetate vapors are returned to the still through P.

Instead of isopropyl acetate it is equally possible to apply the method to any other ester boiling under 118° C. or to ketones, to light wood oils or tar oils, to oxide-ethers and so forth.

If it is desired to concentrate acetic acid solutions already relatively concentrated, it is possible in a known manner to add to the solvent, a hydrocarbon judiciously selected in order to minimize the solubility of the solvent in the acid solution and conversely the solubility of water in the solvent.

Example 3

The dehydration of a 25% acetic acid solution in which the acetates dissolve in large proportions. A mixture of ethyl acetate 90% and benzene 10% is used as solvent. With eight double plates the extraction is complete with a retrogradation of 200 litres for every 100 litres of dilute acid fed in. The extract which runs on the upper plate 6 of the dehydration zone contains all the acid and has the following composition:

|  | Per cent |
|---|---|
| Ethyl acetate + benzene | 80 |
| Acid | 10.5 |
| Water | 9.5 |

The 80% of solvent being incapable of entraining all the water a portion of the vapors are taken to plate 4 and condensed, in Y. The upper layer formed in K is led to plate 4 by the pipe $m$ whilst the aqueous layer is sent back through pipe $n$ to a convenient point in the extraction zone. The temperature at the top of the column is in the neighborhood of 70 to 71° C. The vapors which escape and which retrograde after condensation contain 8 to 9% of water. The water which is withdrawn from the top decantation chamber is free of the acids and contains about 4.5% of the acetate-benzene mixture which may be recovered by simple distillation.

The anhydrous solvent-acid mixture leaving the upper column, at the base of which the temperature is about 90° C., is separated in the small column $x$; one part comprising an acid-benzene mixture is returned to the purification zone through pipe $p$, the other part comprising pure anhydrous acid is withdrawn through pipe $w$ by overflow. In this example the benzene could have been replaced by another hydrocarbon or a chlorine derivative thereof.

Example 4

A dilute solution of 20% acetic acid is continuously introduced into pipe $g$ (Fig. 1) and a double volume of amyl alcohol is introduced through pipe $s$. The mixture that is condensed at E has almost exactly the same composition as the binary azeotropic mixture of water and amyl alcohol, that is to say:

|  | Per cent |
|---|---|
| Amyl alcohol | 50.4 |
| Water | 49.6 |

It is absolutely free from acetic acid.

With regard to the extract leaving the apparatus at $a$ it is almost exclusively composed of amyl alcohol, acid and water being in small proportions. It only contains very small proportions of ester because the presence of the large quantity of water upon the plates opposes the esterification of the alcohol by the acid, but during the final recovery of the amyl alcohol it is possible to operate in a manner such as to obtain total esterification of the acid by using any well known method of esterification. There is then obtained pure amyl acetate, and it is sufficient to add into the extraction circuit in a continuous manner the quantity of amyl alcohol corresponding to that which has been used in the esterification. This example may be utilized for various organic acid esters.

In all of the foregoing examples, acetic acid has been chosen because it is the substance most used in industry but the method is not limited to this acid.

The invention is not limited to the specific apparatus, method or modifications given in these examples which are only given for clearly describing the general principles which form the basis of the invention.

Various applications of the invention will readily suggest themselves to those skilled in the art. Without wishing to limit ourselves, we may cite for example the extraction of tars from pyroligneous acid by a solvent, the extraction of oils or perfumes, the separation of any two bodies by a third and so forth.

Finally the apparatus may be operated either at atmospheric or higher pressure.

Naturally, the term "solvent" in the claims includes mixtures of solvents.

What we claim is:—

1. A process for the continuous extraction of a non-gaseous body from its solution in a liquid, which process comprises supplying the solution and a solvent for the body to be extracted in counter-current, mixing the solution and the solvent and decanting, in a plurality of superposed mixing and decanting stages, allowing one layer of each decantation to descend to the mixing stage below and elevating the other layer to a higher mixing stage, while supplying heat at the base, the mixing in each stage being effected by bubbling through the liquids therein vapors arising from the stage below.

2. Apparatus for the process specified in claim 1, comprising a distillation column having a plurality of bubble plates, decanting chambers individual to the bubble plates, overflow pipes for conducting the liquid from each bubble plate to a decanting chamber below, overflow pipes for conducting one layer from each decanting chamber to a bubble plate below, and means for elevating the other layer from each decanting chamber to a bubble plate above.

3. Apparatus for the process specified in claim 1, comprising a distillation column having a plurality of bubble plates and decanting plates below the bubble plates, said decanting plates having open vapor pipes which allow the vapors from a mixing plate below to pass directly to a mixing plate above, each decanting plate forming a decanting chamber with the interior of the column, overflow pipes from the bubble plates to the decanting chambers, means for conducting one layer from each decanting chamber to a bubble plate below, and means for raising the other layer from each decanting chamber to a bubble plate above.

4. Apparatus for the process specified in claim 1, comprising a distillation column having double elements, each double element comprising a mixing plate having a bubbling passage and an underlying decanting plate having a passage for allowing the vapors from a lower mixing plate to pass directly to the bubbling passage of the mixing plate above, each mixing plate having an overflow pipe to the decanting plate below, each decanting plate having an overflow pipe for conducting its upper layer of liquid to the mixing plate below it, each mixing plate forming with the interior of the column a mixing chamber wherein solvent and solution are mixed by bubbling vapors through the liquids, each decanting plate forming with the interior of the column a decanting chamber of larger liquid capacity than the mixing chamber, together with means for conducting the lower layer of each decantation to a higher mixing plate.

5. In a process for the continuous extraction of a non-gaseous body from a solution thereof by means of a solvent for said non-gaseous body, in a plurality of stages, the step which consists in mixing said solution with said solvent by bubbling vapors arising from one stage through the liquid in the next succeeding stage.

6. A process for the continuous extraction of a fatty acid from an aqueous solution thereof and for esterifying the acid, which comprises mixing the aqueous solution of such acid with an esterifying solvent for said acid, by bubbling vapors through the liquids in a plurality of successive stages on the counter-current principle, allowing the mixture to settle after each mixing stage and thereby to stratify into a solvent layer and an aqueous layer, forwarding the former layer to a lower mixing stage and elevating the latter layer to a higher mixing stage, supplying heat at the base, so that the acid is partially esterified simultaneously with its extraction and drawing off the solvent and the acid partially esterified, after which the esterification is completed.

ELOI RICARD.
HENRI MARTIN GUINOT.
ANDRÉ MARIE PARANT.